Sept. 28, 1965 W. E. SCHOBER 3,208,681

BRAKE MECHANISM FOR TAPE RECORDERS

Filed Oct. 11, 1963 2 Sheets-Sheet 1

INVENTOR.
WAYNE E. SCHOBER
BY
Merchant, Merchant & Gould
ATTORNEYS

Sept. 28, 1965 W. E. SCHOBER 3,208,681

BRAKE MECHANISM FOR TAPE RECORDERS

Filed Oct. 11, 1963 2 Sheets-Sheet 2

INVENTOR.
WAYNE E. SCHOBER

BY

Merchant, Merchant & Gould

ATTORNEYS

United States Patent Office 3,208,681
Patented Sept. 28, 1965

3,208,681
BRAKE MECHANISM FOR TAPE RECORDERS

Wayne E. Schober, Minneapolis, Minn., assignor to Viking of Minneapolis, Inc., Minneapolis, Minn., a corporation of Minnesota Filed Oct. 11, 1963, Ser. No. 316,207
2 Claims. (Cl. 242—55.12)

This invention relates to a new and very useful differential reel brake mechanism for tape and/or wire recorders.

This application is a continuation-in-part of my earlier filed application Serial No. 215,831, filed August 9, 1962 and now abandoned.

More particularly, this invention is directed to a brake mechanism for a tape or wire recorder of the type having a frame structure, a pair of reel-driving shafts, a pair of reels one mounted on each such shaft, and power-operated mechanism carried by said frame structure for imparting rotary movements to said shafts selectively each in a direction counter to the direction of the other, whereby tape or wire is transferred from one reel to the other by rotating or driving the reel upon which said tape or wire is being wound. The brake mechanism comprises a pair of cylindrical drums one each fast on a different one of said shafts, a pair of elongated flexible brake members, each loosely engaging a circumferential surface portion of a different one of said drums, a pair of yieldable anchor elements each holding the outer end of each of said brake members to said frame structure, and shiftable means holding the inner end of each of said brake members and adapted to move the drum engaging portions of said brake members toward and away from engagement with said drums. Each of said brake members extend tangentially away from its respective drum toward its respective yieldable anchor element in the direction of power driven rotation of its respective drum. The shiftable means includes yielding means urging said inner ends of said flexible brake members in one direction of shifting movement thereof, and mechanism for shifting said inner ends of said flexible brake members in the opposite direction against bias of said means.

It is an object of this invention to provide a differential braking mechanism suitable for tape or wire recorders of the type wherein tape or wire is transferred from one reel to another during operation of a tape or wire deck.

It is another object of this invention to provide a differential reel brake which stops reel rotation of each reel of a pair in a minimum of time without overrun or excessive tensioning of tape or wire.

It is another object of this invention to provide a tape or wire recorder brake which can exert a greater braking force on the pay-off reel than on the take-up reel, independently of the direction of reel rotation (clockwise or counterclockwise).

It is another object of this invention to provide in a single braking device a mechanism which will prevent wire or tape, hereinafter for convenience referred to as tape, overrun both in the case of power interruption or failure (when the reels would normally just spin) and in the case of routine reel stopping during normal machine operation.

Other and further objects of this invention will become apparent to those schooled in the art from a reading of the following specification in conjunction with the attached drawings wherein.

Figure 1:
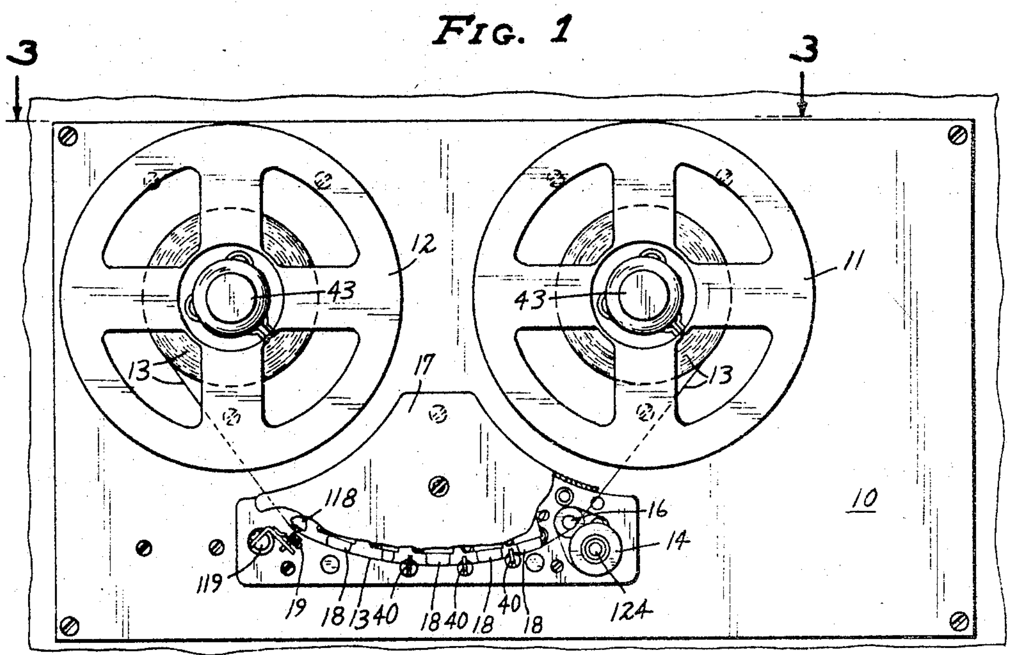
FIG. 1 is a view in top plan of the tape deck of a tape recorder employing one embodiment of the brake of this invention, some parts of the tape recorder broken away.

Referring to FIG. 1, there is seen the tape deck 10 of a recorder in which are positioned paired combined drum and spindle assemblies 21 and 52. Tape reels 11 and 12 fit over assemblies 21 and 52 respectively. Tape 13 from reel 12 passes over conventional recording and playback and erase heads 18 past drive capstan 16 to be taken up on reel 11. The tape 13 is pressured against drive capstan 16 by means of pressure of idle roller 14 which turns on axle 124. Guide post 118 with spring mounted pressure arm 19 serves to position and guide tape 13 for passage over heads 18. Transversely (to direction of tape 13) movable tape guide arms 40 lift tape away from heads 18 during recorder operations other than record and playback. A housing 17 covers the heads 18, guide post 118, pressure arm 19, guide arms 40, capstan 16, idle roller 14, and associated parts. Flexible retaining caps 43 (paired) frictionally engage the spindle portion of combined drum and spindle assemblies 21 and 52 in place after mounting.

Figure 2:
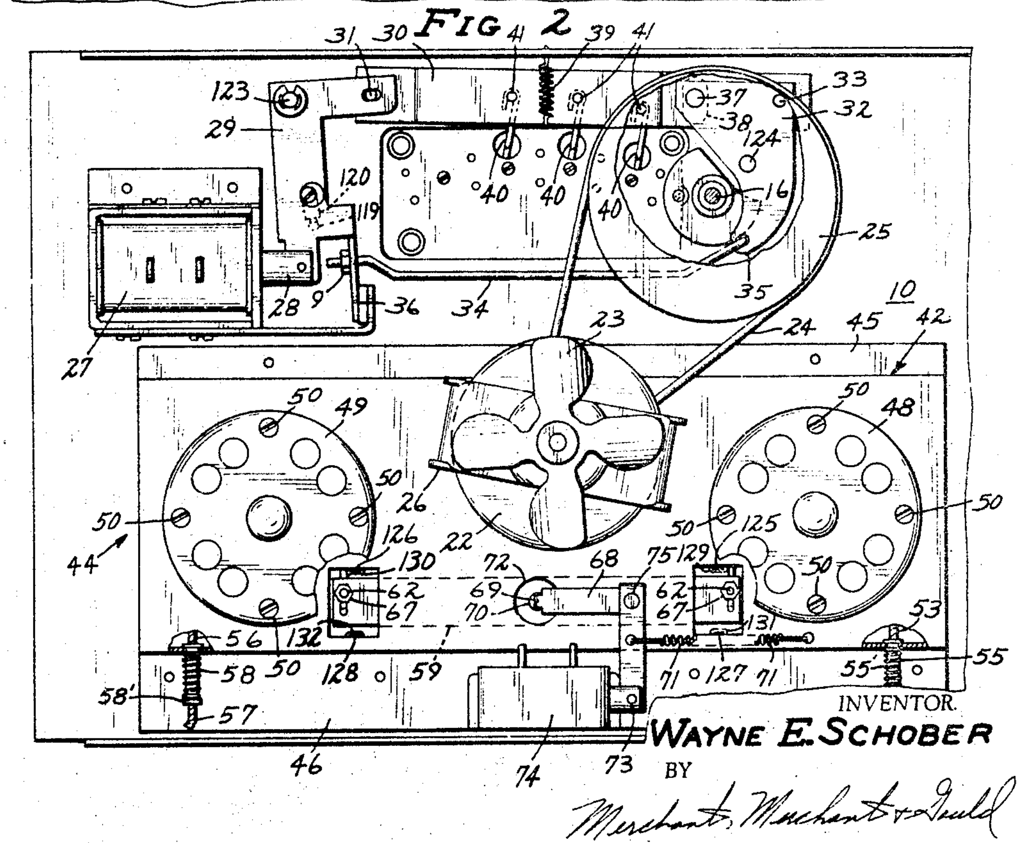
FIG. 2 is a bottom plan view of the tape deck of FIG. 1 with some parts broken away.
Figure 3:
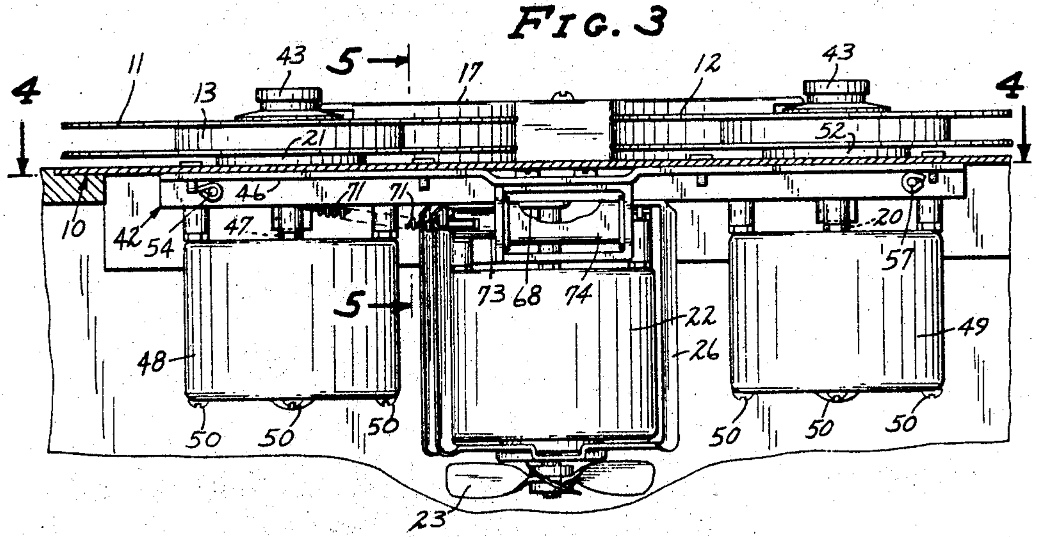
FIG. 3 is a vertical sectional view taken along the line 3—3 of FIG. 1 with some parts broken away.

In FIG. 2 is shown the bottom side of the tape deck of FIG. 1 with certain parts cut away so as to show more clearly an embodiment of a brake mechanism of this invention. Capstan drive motor 22 with its positioning harness 26 drives power transfer belt 24 which in turn turns fly wheel 25. Fly wheel 25 is on capstan 16 for common rotary movements. Capstan drive motor 22 is cooled by cooling fan 23.

Motors 48 and 49 drive respective shafts 47 and 20. Upon shaft 47 is axially mounted combined drum and spindle assembly 21, and upon shaft 20 is mounted combined drum and spindle assembly 52. Thus, motor 48 turns combined drum and spindle assembly 21, and motor 49 turns combined spindle and drum assembly 52. Motor 48 turns combined drum and spindle assembly 21 in a clockwise direction, and combined drum and spindle assembly 52 is driven in a counter-clockwise direction by motor 49. Tape motors 47 and 48 are used alternately for transport and rewind during recorder operation.

Solenoid 27 is shown with its armature 28 extended, i.e. the solenoid 27 is de-energized. Armature 28 is rotatably connected with one end of bellcrank 29. Bellcrank 29 is rotatably mounted on a shaft 123 and has one end pivotally connected to lever arm 30 by means of post 31. Lever arm 30 is pivotally connected with modified bellcrank 32 by means of shaft 33. End 35 of modified bellcrank 32 is in turn pivotally connected with arm 34. The other end of arm 34 joins extension 36 of bellcrank 29 by means of adjustable nut 9. Shaft 124 for the pressure roller 14 connects with the bellcrank 32 so that when bellcrank 32 moves, shaft 124 moves roller 14 into and away from engagement with capstan 16.

When solenoid armature 28 moves into solenoid 27 (i.e. when the solenoid is energized) bellcrank 29 pivots on shaft 123 thereby causing lever arm 30 to move downward (i.e. sidewards). As armature 28 moves, the arm 34 is pulled inward in the same direction as armature 28. As a result, bellcrank 32 is caused to pivot on shaft 33 within the area permited by its stop 37 which rides in slot 38 of lever arm 30. Such pivotal movement of bellcrank 32 imparts movement to lever arm 30 and hence shaft 124 of pressure roller 14 has motion into and away from capstan 16. To the top side of arm 30 (the bottom side is shown in FIG. 2) are fastened a plurality of tape guide arms 40 each by means of an adjustable set screw 41. The sidewards movement of arm 30 by lever 29 causes the tape guide arms 41 to lift tape 13 away from the recording and playback heads 18 during rapid tape transport past the recording and playback heads (i.e. as during rewind). Pressure arm 19 pivots on an axle 119 in tape deck 10; thus axle 119 has secured to its bottom end a lever arm 120. This lever arm 120 pivotally engages an arm of bellcrank 29, so that when armature 28 moves bellcrank 29, axle 119 turns pivoting pressure arm 19. This whole lever arrangement is tensioned by means of tension spring 39 which yieldingly urges arm 30 sidewards, thereby tending to pull solenoid armature 28 from engagement with solenoid 27 when solenoid 27 is deenergized.

For reasons of convenience in manufacture and maintenance, motors 48 and 49 (paired) and motor 22 are separately mounted on a common plate or deck herein referred to generally as the brake deck 42. This deck 42, which is in effect a subdeck of tape deck 10, is mountable and demountable from the underside of tape deck 10. It is upon brake deck 42 that the differential braking mechanism of this embodiment is mounted.

To provide space between brake deck 42 and tape deck 10 when brake deck 42 is mounted on the underside of tape deck 10 a recessed area 44 is formed on the top of brake deck 42 by suitable folds in the sheet material (usually metal) making up the construction material of brake deck 42 (and also tape deck 10). The result is that two shelves, 45 and 46, respectively, are formed in brake deck 42. As indicated earlier, motors 48 and 49, drive shafts 47 and 20, respectively. Each motor (48 and 49), and its associated shafts, is suspended from brake deck 42 in the depressed recess region 44 by means of four long screws 50 circumferentially placed in the housing of each motor. Each screw 50 is then bolted in place by means of nuts 51. To the upper end of shaft 47 on motor 48 is mounted a combined spindle and braking drum 21 and to the upper end of shaft 20 on motor 49 is mounted similar combined spindle and braking drum 52. The braking drum portion 121 is in the form of an axially mounted cylindrical section and a spindle portion which lies on its axis. The spindle portion is integrally formed with the drum portion, as a matter of convenience, out of metal or plastic. The upper face of the braking drum forms a good platform upon which a reel can rest during machine operation.

About the outer circumferential surface of the drum portion 12 of combined braking drum and spindle 21 is wrapped approximately one and one-half turns of a cord 53. The outer end 54 of cord 53 is clamped into the free end of a compression spring 55 which is mounted on a grommet 55′ slidably mounted in the wall 46, the spring 55 being interposed between the wall 46 and the outer end of the grommet 55′ in a predetermined slightly compressed or loaded condition. Similarly, a cord 56 is wrapped approximately one and one-half times about the outer circumferential surface of the braking drum portion 121 of the combined braking drum and spindle 52. The outer end 57 of cord 56 is clamped into the free end of a compression spring 58 which is monuted on a grommet 58′ slidably mounted in the wall 46, the spring 58 being interposed between the wall 46 and the outer end of the grommet 58′ in a predetermined slightly compressed or loaded condition. Compression springs 58 and 55 are chosen so as to have approximately equal bias characteristics. While compression spring means are shown here, those skilled in the art will appreciate that any conventional spring means could be employed in this embodiment for anchoring the outer ends 54 and 57, respectively, of cords 53 and 56. It is preferred to pretension springs 55 and 58 so as to provide a fairly constant bias which is comparatively independent of deflection and tension variations common to even individual springs of the same class.

A tie bar 59 is located generally between combined drum and spindles 21 and 52, on the top of brake deck 42 in recess 44 so as to conveniently engage and secure the inner ends 60 and 61 of cords 53 and 56, respectively. A screw clamp assembly 62 is used to fasten cords 53 and 56, respectively, to the ends of tie bar 59. Each end of tie bar 59 is bent over slightly so as to form a generally right-angled pair of leaves 63 and 64 for positioning clamp assemblies 62. Cord 53 is engaged by one clamp 62 so as to lie adjacent leaf 63, while cord 56 is engaged by the second screw clamp at the opposite end of tie bar 59 so as to lie adjacent leaf 64. Windows 65 and 66, respectively, underneath the ends of tie bar 59 are provided so that when the brake deck 42 is in position on the bottom of tape deck 10, it is possible to conveniently adjust and position respective cords 53 and 56 through the bottom of brake deck 42 by simply loosening and/or tightening nuts 67 on the bottom of each screw clamp 62.

In approximately the middle of tie bar 59 is a hole 70 into which is inserted a tongue 69 on the end of bellcrank 68 so that one end of bellcrank 68 can pivotally engage tie bar 59.

Tongue 69 is held in position by a resilient retaining collar 15 formed of a material such as rubber. One end of a tension spring 71 engages bellcrank 68 while the other end of such spring 71 engages brake deck 42, thereby tensioning cords 53 and 56 on their associated respective brake drums. Spring 71 exerts less tension on cords 53 and 56 than do springs 55 and 58 on their respective cords 53 and 56. Another window 72 is provided in brake deck 42 so that the tongue 69 of bellcrank 68 can reach hole 70. The other end of bellcrank 68 engages solenoid armature 73 of solenoid 74. Bellcrank 68 pivots on shaft 75.

The solenoid 74 is energized during energization of either of the motors 48 and 49, and deenergized simultaneously with deenergization of the motors 48 and 49. When solenoid 74 is energized and solenoid armature 73 moves into solenoid 74, bellcrank 68 pivots on shaft 75, causing tie bar 59 to move laterally in one direction, thereby relieving tension on cords 53 and 56. When, however, solenoid 74 is deenergized, tension spring 71 yieldingly urges tie bar 59 laterally in the opposite direction thereby tensioning cords 53 and 56, with the result that the cords 53 and 56 provide a braking action upon their respective brake drum portions 121. Lateral movement of tie bar 59 is limited by stops 125, 126, 127 and 128 secured to and projecting upwards adjacent the side edges of tie bar 59, each stop including a respective cushion element 129, 130, 131 and 132 preferably of plastic material. The lengths of the cords 53 and 56 are such that, when the solenoid 74 is energized, the springs 55 and 58 are expanded to the limit permitted by their respective grommets 55′ and 58′, with the cords 53 and 56 loosely encompassing their respective drums 21 and 52. When the motors 48 and 49 and solenoid 74 are deenergized, the spring 71 moves the tie bar into engagement with the stops 127 and 128, causing both cords 53 and 56 to be disposed in wrapping engagement with their respective drums.

Figure 4:
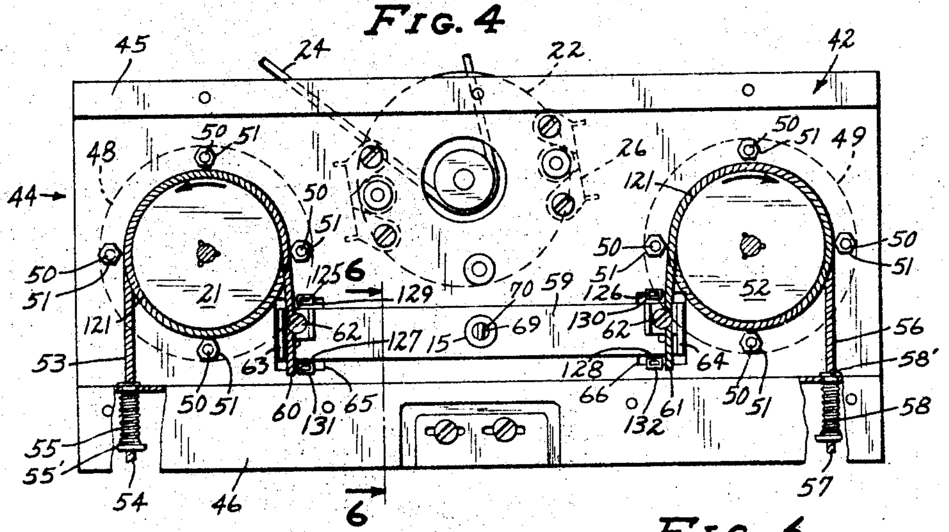
FIG. 4 is a view in section of a brake deck taken along the line 4—4 of FIG. 3, some parts being broken away and some parts being shown in top plan.
Figure 5:
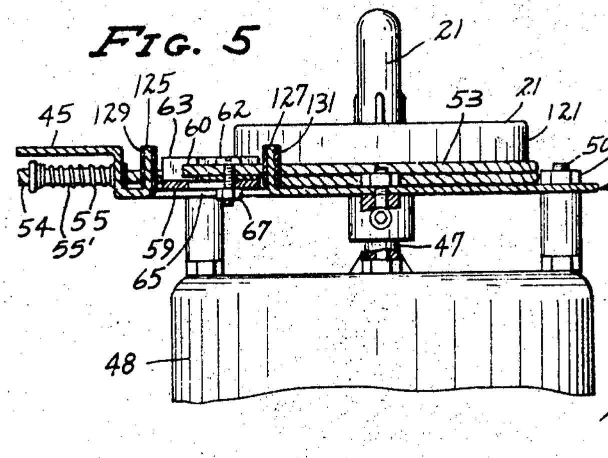
FIG. 5 is an enlarged vertical cross-sectional view taken along the line 5—5 of FIG. 3.
Figure 6:
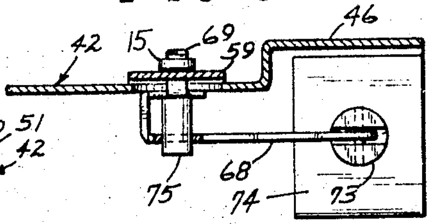
FIG. 6 is an enlarged vertical cross-sectional view taken along the line 6—6 of FIG. 4.

When either of the motors 48 or 49, whichever is operating, and the solenoid 74, are deenergized, a differential braking action is effected between the drums 21 and 52. Assuming that the motor 48 has been driven to rotate the drums 21 and 52 in a counterclockwise direction with respect to FIG. 4, the reel 11 mounted on the drum 21 being a take-up reel, and the reel 12 mounted on the drum 52 being a pay-off reel, braking force is applied to both drums 21 and 52 by means of their respective braking cords 53 and 56. However, the braking force applied to the drum 52 by the cord 56 is greater than that exerted on the drum 21 by the cord 53 due to the fact that the tensioning force applied against counterclockwise rotation of the drum 52 by the stronger spring 58 and its cord 56 is greater than that applied against counterclockwise rotation of the drum 21 by the weaker spring 71 and cord 53. As a result, the payoff reel 12 tends to decelerate more rapidly than the take-up reel 11, so that the tape or wire therebetween is subject to tension sufficient to prevent overrunning of the same from the payoff reel 12, but not sufficient to place undue strain upon the tape or wire between the reels 11 and 12. A similar braking action occurs when the drums rotate clockwise with respect to FIG. 4, the reel 11 on the drum 21 then being a payoff or unwinding reel and the reel 12 on the drum 52 being a take-up or winding reel. In this direction of rotation, the tensioning force exerted against clockwise rotation of the drum 21 by the stronger spring 55 and its cord 53 is greater than that exerted against clockwise rotation of the drum 52 by the weaker spring 71 and cord 56.

Otherwise stated, the spring 71 performs a dual function. Not only does it set the cords 55 and 56 into operative engagement with their respective drums 21 and 52 when the solenoid 74 is deenergized, but it also provides the differential braking factor between the drums 21 and 52 in either direction of rotation of the drums and their respective reels. When the drums are rotating counterclockwise, the braking force applied to the drum 21 is approximately equal to the radius of the drum 21 multiplied by the force exerted by the spring 71; and the braking force applied to the drum 52 is approximately equal to the radius of the drum 52 multiplied by the force exerted by the spring 56. When the drums 21 and 52 are rotating in said clockwise direction, the braking force applied to the drum 21 is approximately equal to the radius of the drum 21 multiplied by the force exerted by the spring 53; and the braking force of the drum 52 is approximately equal to the radius of the drum 52 multiplied by the force exerted by the spring 71.

When power is interrupted, as either intentionally or through power failure, the rotation of reels 11 and 12 is promptly stopped, for when power flow through solenoid 74 is interrupted, the differential brakes are spring applied and the respective reels stop rotating. If such were not the case, a loop or so of tape is thrown. On the other hand, when power is on and reels are rotating, the combined braking drum and spindles 21 and 52, respectively, rotate freely and there is substantially no braking action exerted upon them.

While the embodiment just described uses about one and one-half loops of cord or elongated flexible brake member on each drum, there is no criticality in this number of loops for the reason that braking action is substantially independent of the frictional characteristics of the surface. The minimum contact distance depends upon the value of the tensioning springs employed, and the radius of the particular drum involved, the nature of the surfaces, etc. In practice, I have found that, by providing a brake member as above described, which is wound around its respective drum to the extent of at least one or one and a half turns, smooth and uniform braking action is achieved, and the smoothness and uniformity of the braking action is not unduly affected by normal changes in temperature and moisture content in the air.

Because each end of an elongated flexible brake member is anchored to a yielding means, it is practically impossible to get grabbing action causing irregular braking or even sudden seizing and freeze-up of an elongated flexible brake member upon its associated drum. Such grabbing action is disadvantageous because it can result in overloading to such an extent that the tape breaks or parts of the machine are strained necessitating machine readjustment.

Thus, it is seen that the differential brake mechanism of this invention is intended for use in a tape or wire recorder of the type wherein tape or wire is transferred from one reel to another during a playback, rewind or other recorder operation involving tape transport. The brake is operative independently of the method of transporting the tape or wire from one reel to the second. This differential brake can be installed so that, as each reel decelerates on its respective shaft after intentional or deliberate power cut-off to the shaft drive means, the deceleration or braking force is always exerted in such a way as to prevent both tape or wire overrun from the payoff reel and undue tensioning of tape or wire upon the take-up reel.

While the pair of cylindrical drums in the foregoing embodiments is shown to be generally coplanar, such an arrangement is not at all necessary or critical. Each drum, however, always is mounted fast on one of the two reel shafts.

Each one of the two elongated flexible brake members is loosely wrapped circumferentially about the outer circumferential surface of its respective drum, one cord being wrapped in a generally clockwise manner, the other counter-clockwise, from said outer ends thereof. The outer end of each such brake member is fastened to and tensioned by a yieldingly biased anchor means.

It is not necessary that the cylindrical drums have equal radii, that the cords be matched as to length, diameter, material of construction, that the same length of cord circumferentially wrap a like portion of the side surface of each drum, that each anchor means be the same as the other in its holding and tensioning characteristics, or the like.

In general, in the embodiment shown, the braking force or braking torque exerted on a shaft is equal to the radius of a cylindrical drum fast on such shaft multiplied by the tensioning force holding the end of the flexible brake member against the drum. The braking action is symmetrical (i.e., the same in either direction of tape travel) and no special memory solenoid or the like is necessary to control the differential braking action exerted by the mechanism of this invention. It has been found that the ratio of braking torque applied to the shaft mounting the payoff reel compared to the braking torque simultaneously applied to the shaft mounting the take-up reel should fall in the range of from about 1.7:1 to 5.6:1.

While in the embodiment shown and described herein there is employed cord whose cross-section is generally circular, such a cord has been used for purposes of illustration only and not by way of any critical limitation. Thus, there can be employed an elongated flexible brake member which is in the form of a band or even one having an elliptically shaped cross-section. Similarly, neither the construction material used for the elongated flexible brake member, nor the nature of the material used in the construction of the brake drum itself is of consequence, although usually for the purposes of conventional manufacture, metallic drums and fabric elongated flexible brake members have been employed. The nature of the drum surface does not appreciably affect the braking action achieved which is generally uniform over a wide range of conditions because the braking force is determined only by the tension on the spring and the radius of the braking drum and is substantially not affected by the condition of the braking surface of the drum or of the surface of the elongated flexible braking member.

The inner end of each flexible brake member is fastened to such means as will effect a substantially simultaneous application or tensioning of each such member upon its associated drum. This means must be capable, then, of causing the brake member on each reel shaft to come into operation at substantially the same point in time. While in the foregoing embodiment there is employed a system of releasing employing spring and tie bar, the method and means for release is not a critical feature and in fact any system for release can be employed for this invention, either electrical, mechanical, or electro-mechanical. Instead of a tie bar, each drum can have its flexible brake member independently released. Also, while for purposes of description, the foregoing brake embodiments of this invention are indicated to go into operation whenever there is an interruption of the power supply, it will be appreciated by those skilled in the art that the braking mechanism of this invention is applicable whenever there is a diminution or lessening of power to the means used to drive the tape or wire reels, or in general, whenever it is desired to control the speed of a pair of shafts coacting together in the manner described.

My invention has been thoroughly tested and found to be completely satisfactory for the accomplishment of the above objects, and while I have shown and described a preferred embodiment, I wish it to be specifically understood that the same is capable of modification without departure from the spirit and scope of the appended claims.

What I claim is:

1. Braking mechanism for a magnetic recorder, said recorder comprising, a frame structure, a pair of reel driving shafts, a pair of reels each mounted on a different one of said shafts, and power-operated mechanism carried by said frame structure for imparting rotary driving movements to said shafts selectively each in a direction counter to the direction of rotation of the other, whereby a recording carrier is unwound from one of said reels and wound upon the other thereof by rotary power applied to said other reel, said brake mechanism comprising:

(a) a pair of cylindrical brake drums each fast on a different one of said shafts, (b) a pair of elongated flexible brake members each loosely wound at least one full turn about a different one of said brake drums and each having inner and outer ends extending tangentially from their respective drums, (c) a pair of yielding elements one each connected to said frame structure and to a different one of said outer ends and yieldingly biasing said brake members in a drum engaging direction, (d) said outer ends extending from their respective drums toward their respective yielding means each in the direction of power-driven rotation of its respective drum, (e) a tie-bar extending between said drums and having opposite ends each disposed adjacent a different one of said drums and movable in opposite directions relative to said drums, (f) means for adjustably securing the inner ends of said brake members each to an adjacent end of said tie-bar, (g) stop means engageable with said tie-bar to limit movement of said tie-bar in said opposite directions, (h) yielding means urging said tie-bar in one direction of movement thereof to move said brake members into braking engagement with their respective drums, (i) and a power-operated member connected to said tie-bar and operatively associated with said yielding means for moving said tie-bar in the opposite direction against bias of said yielding means to move said brake members away from braking engagement with their respective drums.

2. The structure defined in claim 1 in which said yielding means comprises a spring having a yielding bias less than either of said yielding elements and sufficient to produce a ratio of braking torque applied to the drum associated with an unwinding reel to that applied to the drum associated with a cooperating winding reel which falls within a range of 1.7 to 1 and 5.6 to 1.

References Cited by the Examiner

UNITED STATES PATENTS

| | | | |
|---|---|---|---|
| 2,868,470 | 1/59 | Selsted | 242—55.12 |
| 2,911,162 | 11/59 | Kyle | 242—55.12 |

MERVIN STEIN, *Primary Examiner.*